March 26, 1957  F. L. THARP  2,786,690
MOVING DEVICE FOR HOUSE TRAILERS
Filed Jan. 4, 1954 2 Sheets-Sheet 1
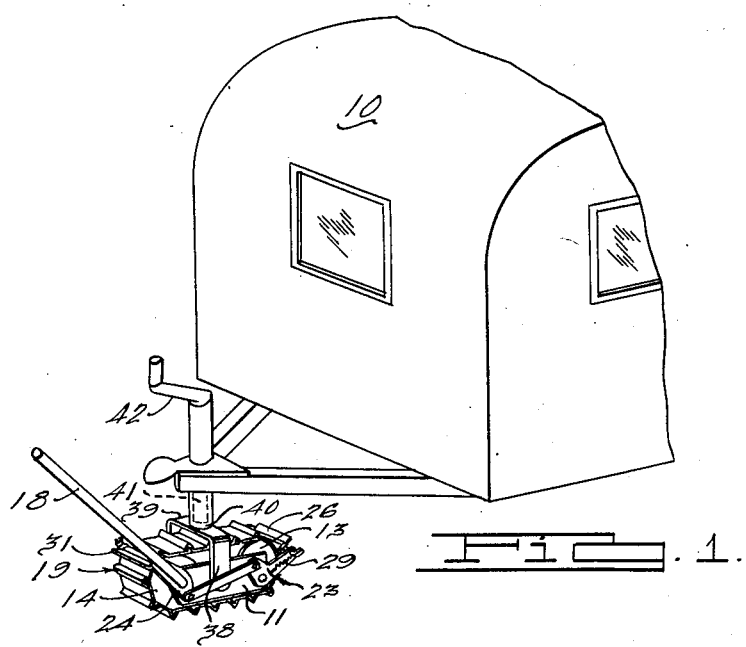
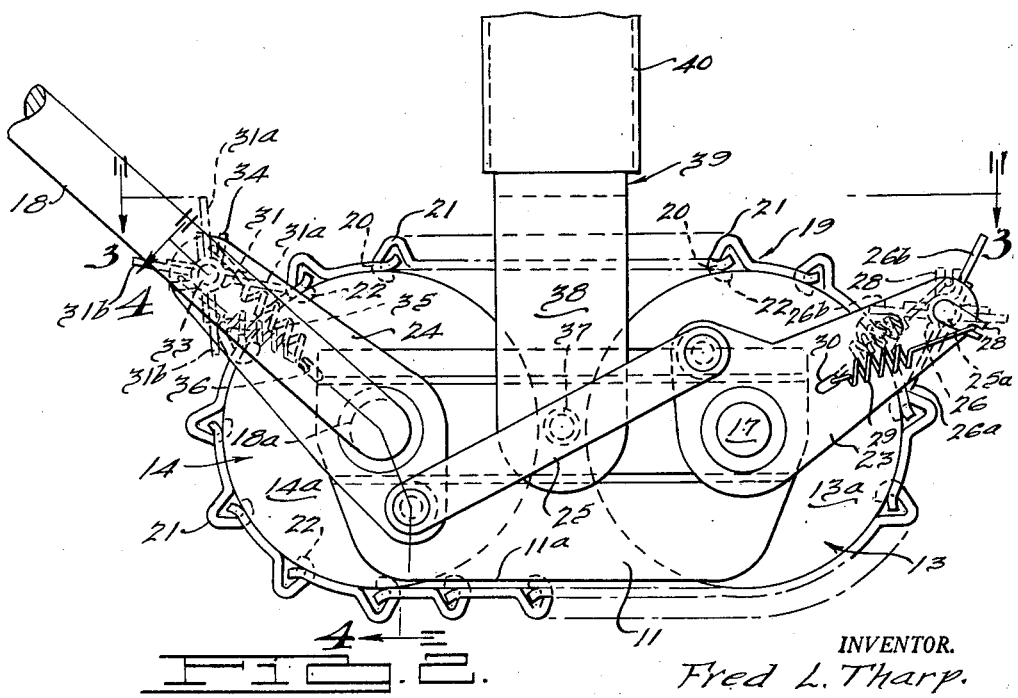
INVENTOR.
Fred L. Tharp.
BY
Elmer Jamison Gray
ATTORNEY.

March 26, 1957 F. L. THARP 2,786,690
MOVING DEVICE FOR HOUSE TRAILERS
Filed Jan. 4, 1954 2 Sheets-Sheet 2
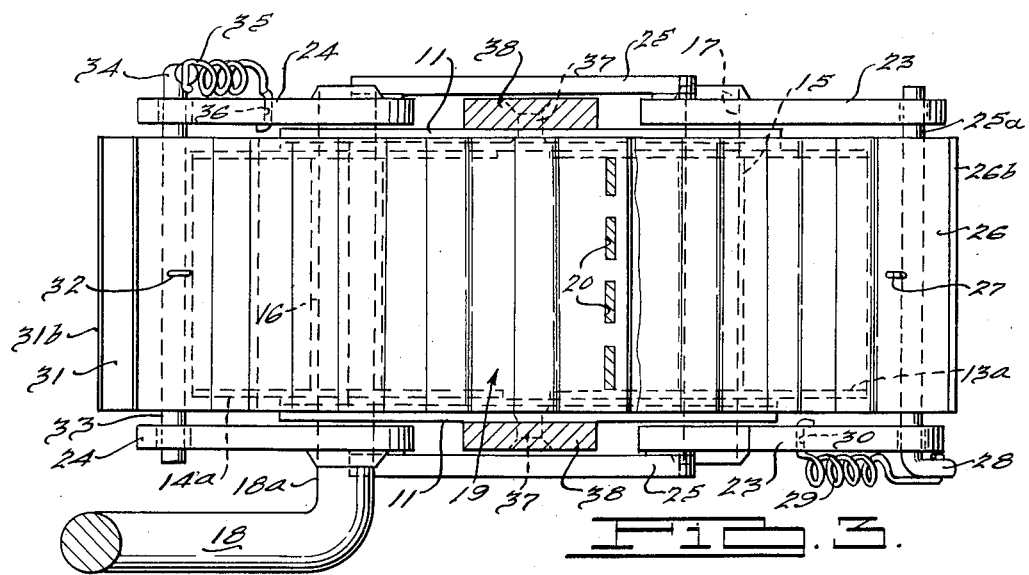
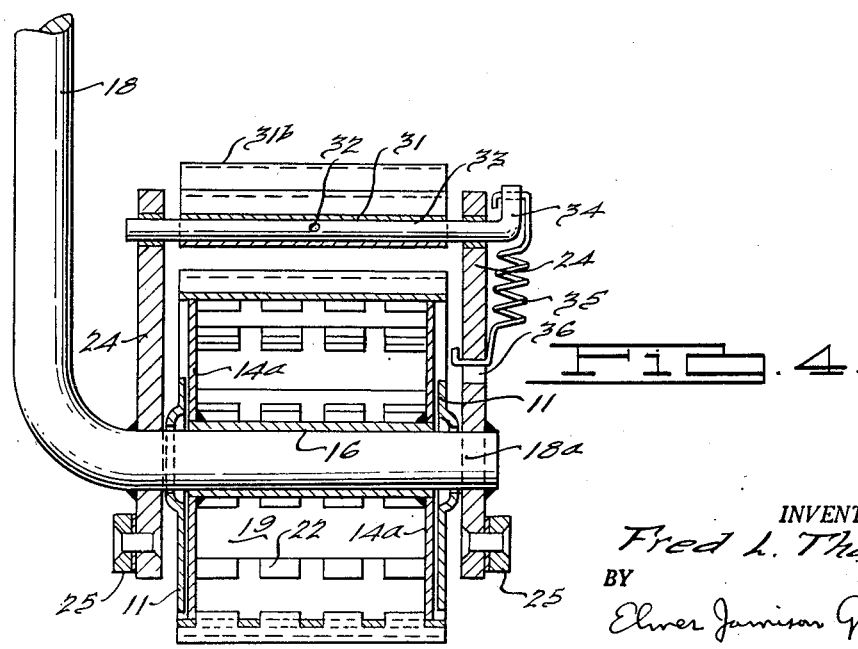
INVENTOR.
Fred L. Tharp.
BY
Elmer Jamison Gray
ATTORNEY.

United States Patent Office 2,786,690
Patented Mar. 26, 1957

2,786,690

MOVING DEVICE FOR HOUSE TRAILERS

Fred L. Tharp, East Detroit, Mich.

Application January 4, 1954, Serial No. 402,086

9 Claims. (Cl. 280—3)

This invention relates to a manually actuated device particularly adapted for moving house trailers and the like.

An important object of the present invention is to provide a simple, economical, and highly efficient device adapted to support one end of a trailer by way of example and to be moved along the ground by manual actuation, thereby to facilitate shifting of the trailer into position for coupling with the rear end of an automobile or into a desirable parking location not readily accessible by means of the automobile.

Another object is to provide such a device comprising ground engaging roller means mounted on a frame which also supports an upwardly opening cylindrical socket adapted to receive the depending shaft of the customary leveling jack of the trailer, whereby the latter is supported in a level position when uncoupled from the automobile or other prime mover. Reciprocable manually actuated operating means are provided on the frame for driving the roller means unidirectionally upon shifting of the operating means in either direction of its reciprocable movement.

Another object is to provide such a device of the endless belt type having a pair of adjustable driving pawls pivotal to one position for driving the roller means in a forward direction upon reciprocation of the operating means and pivotal to a reversing position for driving the roller means in a rearward direction upon reciprocation of the operating means. Accordingly the trailer can be readily moved forwardly or rearwardly by suitably adjusting the pawls.

Other objects of this invention will appear in the following description and appended claims, reference being had to the accompanying drawings forming a part of this specification wherein like reference characters designate corresponding parts in the several views.

Fig. 1 is a fragmentary perspective view showing an embodiment of the present invention in application with a house trailer.

Fig. 2 is a fragmentary enlarged side view of the device shown in Fig. 1, the trailer being removed.

Fig. 3 is a horizontal section taken in the direction of the arrows substantially along the line 3—3 of Fig. 2.

Fig. 4 is a fragmentary section taken in the direction of the arrows substantially along the broken line 4—4 of Fig. 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, an embodiment of the present invention is illustrated by way of example in an application supporting the forward non-wheeled end of a house trailer 10, Fig. 1, which can be of customary construction. As indicated in Fig. 3, a pair of directly opposed and coextensive vertical side plates 11 comprise a supporting frame for forward and rearward rollers 13 and 14 respectively having parallel horizontal tubular hubs 15 and 16 respectively. The hub 15 is welded at opposite ends to a pair of coaxial discs 13a, which space the plates 11 and comprise the sides of the roller 13, and is journaled on a forward axle 17 having opposite lateral ends projecting through and supported by the side plates 11.

The hub 16 is similarly welded at opposite ends to a pair of coaxial discs 14a, which also space the plates 11 and comprise the sides of the roller 14, and is journaled on the horizontal lower axle extension 18a of a rearwardly inclined hand operated lever 18, the extension 18a projecting laterally through and being supported by the opposite side plates 11.

Entrained around the rollers 13 and 14 is a continuous rotatable link belt 19 comprising a plurality of links adapted to overlap and ride on the circumferential edges of the discs 13a and 14a. Each link has a short rigid body portion measured circumferentially in the direction of movement and four transversely spaced openings 20 adjacent one end. The other end of each link has four outward projections or ratchet elements 21 terminating in inbent hook portions 22 adapted to hook into the openings 21 of the adjacent link to complete an articulated connection therewith. As indicated in Fig. 2, the plates 11 extend downward to horizontal bottom edges 11a which comprise shoes or gliders closely overlying the lateral edges of the bottom or ground engaging portions of the belt 19 intermediate the rollers 13 and 14, thereby to hold the belt 19 substantially flat against the ground and to achieve a broad flat area of ground contact.

The lateral projections of the axle 17 beyond the plates 11 are welded to the hubs of a pair of swinging crank members 23 similar to each other and closely spaced by the plates 11. Similarly the lateral projections of the axle portion 18a beyond the plates 11 are welded to the hubs of a pair of crank members 24 also similar to each other and closely spaced by the plates 11, Figs. 3 and 4.

The crank members 23 and 24 at either side are connected for operation in unison by means of a pitman 25 having a forward end pivotally connected to the corresponding member 23 at a location above the pivot axis of the latter and having a rearward end pivotally connected to the corresponding member 24 at a location below the latter's pivot axis. Accordingly upon pivoting of either crank member in one rotary direction, the other crank member will pivot in the opposite rotary direction.

Pivotally supported adjacent the outer ends of a pair of rearwardly inclined arms of the members 23 is a horizontal transverse shaft 25a on which is keyed a rearward pawl 26. The latter comprises a central hub, sleeved on the shaft 25a and keyed thereto by a suitable pin 27, and a pair of oppositely directed driving elements 26a and 26b. One end of the shaft 25a is bent outward at 28 perpendicularly to the elements 26a and 26b and is provided with a slotted outer end secured to one end of a coil spring 29. The other end of the latter is secured within an opening 30 in the adjacent member 23. The spring 29 extends parallel to a radius of the member 23 when the elements 26a and 26b are parallel to a tangent to the roller 13 and is under tension urging the arm 28 radially inward, thereby to effect an overcenter action urging either the element 26a into driving contact with the belt 19, as in Fig. 2, or the element 26b into said driving contact, as indicated in phantom in Fig. 2, depending on the side of dead center to which the arm 28 is manually flipped.

Similarly to the forward pawl 26, a rearward pawl 31 is keyed by a pin 32 on a horizontal transverse shaft 33 pivotally supported at opposite ends within a pair of rearwardly inclined arms of the crank members 24. The pawl 31 comprises a pair of oppositely directed driving elements 31a and 31b comparable to the elements 26a and 26b. One end of the shaft 33 is bent outwardly at 34 perpendicularly to the elements 31a and 31b and is slotted at its outer end to engage one end of a coil spring 35. The latter extends parallel to a radius of the adjacent member 24 when the elements 31a and 31b are parallel to a tangent to the roller 14 and is secured under tension to the member 24 within a slot 36 thereof, thereby to urge either the element 31a into driving engagement with the belt 19, as shown in Fig. 2, or the element 31b into said driving engagement, as indicated in phantom in Fig. 2, depending upon the side of dead center to which the arm 34 is manually flipped.

Pivoted intermediate the rollers 13 and 14 on the opposite side plates 11 by means of rivets 37 are the paired legs 38 of a yoke 39. An upper cross member of the latter above the belt 19 supports a cylindrical upward opening socket member 40 adapted to receive the depending worm shaft 41 of the customary hoist or jack carried by the forward end of the trailer 10. The yoke cross member underlying the member 40 comprises an abutment which supports the lower end of the shaft 41 within member 40. The foregoing structure permits tilting of the yoke 39 forwardly or rearwardly into coaxial alignment with the shaft 41 to facilitate its insertion into the member 40. Thereafter the shaft 41 is shifted vertically to level the trailer 10 by turning crank arm 42 of the jack.

Operation of the assembled device so as to rotate the roller means comprising rollers 13, 14 and belt 19 is accomplished by swinging the hand lever 18 vertically. The latter's lower end 18a is welded to the crank members 24, Fig. 4, to permit manual actuation of the operating means comprising the members 23, 24, pitmans 25, and pawls 26, 31. Upon upward pivoting of hand lever 18, Fig. 2, the pawl driving element 31a moves into driving engagement with one of the belt projections 21, causing rearward travel of the belt 19 and rearward movement of the trailer 10 carried by the yoke 39. During this movement, each pitman 25 swings its connected member 23 counterclockwise in Fig. 2, causing the pawl driving element 26a to ride freely over the projections 21. Upon downward pivoting of hand lever 18, driving element 31a rides freely over the projections 21, during which movement the pitmans drive the members 23 clockwise, causing the driving element 26a to move into driving engagement with the projections 21 to rotate the belt 19 forwardly.

Upon shifting of the pawls 26 and 31 to the phantom positions shown, the reverse travel results. Upon upward movement of lever 18, pawl element 26b is moved into forward driving engagement with the projections 21 and pawl element 31b rides freely forwardly over the projections 21. When lever 18 is swung downward, element 31b moves into forward driving engagement with the projections 21 and element 26b rides freely forwardly over the projections 21. Thus upon reciprocation of lever 18, the belt 19 is rotated rearwardly.

I claim:

1. In a device adapted for moving house trailers, a frame, roller means comprising a pair of rollers journaled on said frame and a continuous ground engaging belt entrained around said rollers, a pair of crank members pivoted on said frame coaxially with said rollers respectively, link means connected with one of said members to be shifted thereby in the rotary direction of pivoting thereof and connected with the other member to pivot the latter in the opposite direction, a pawl on each member shiftable therewith, one pawl shiftable with its member adapted in one rotary direction thereof to engage said roller means and move the same in one direction, the other pawl shiftable with its member adapted in the relatively opposite rotary direction thereof to engage said roller means to also move the same in said one direction, manually actuated handle means for pivoting said members, and means on said frame adapted to engage a portion of said trailer to support the latter.

2. In a device adapted for moving house trailers, a frame, ground engaging roller means rotatably mounted on said frame, a pair of crank members pivoted on said frame, a link having one end connected to a portion of one of said members to be shifted in the rotary direction of pivoting thereof and having its other end connected to a portion of the other member to pivot the latter in the opposite direction, a pawl on each member shiftable therewith, one pawl shiftable with its member adapted in one rotary direction thereof to engage said roller means and move the same in one direction, the other pawl shiftable with its member adapted in the relatively opposite rotary direction thereof to engage said roller means to also move the same in said one direction, and manually actuated handle means for pivoting said members.

3. In a device adapted for moving house trailers, a frame, roller means comprising forward and rearward rollers journaled on said frame and a continuous ground engaging belt entrained around said rollers, the latter having parallel horizontal axes and said belt having a plurality of projections spaced around its periphery and extending outward therefrom, a pair of crank members pivoted on said frame coaxially with said rollers respectively, a link having one end connected to a portion of one of said members to be shifted in the rotary direction of pivoting thereof and having its other end connected to a portion of the other member to pivot the latter in the opposite direction, each member having an arm projecting radially beyond said belt, a pawl mounted on each arm and shiftable therewith, one pawl shiftable with its arm adapted in one rotary direction thereof to engage said belt projections and move the belt in one direction, the other pawl shiftable with its arm adapted in the relatively opposite rotary direction thereof to engage the belt projections to also move the belt in said one direction, manually actuated handle means for pivoting said members, and means on said frame adapted to engage a portion of said trailer to support the latter.

4. In a device adapted for moving house trailers, a frame, roller means comprising forward and rearward rollers journaled on said frame and a continuous ground engaging belt entrained around said rollers, the latter having parallel horizontal axes and said belt having a plurality of projections spaced around its periphery and extending outward therefrom, a pair of crank members pivoted on said frame coaxially with said rollers respectively, a link having one end connected to a portion of one of said members to be shifted in the rotary direction of pivoting thereof and having its other end connected to a portion of the other member to pivot the latter in the opposite direction, each member having an arm projecting radially beyond said belt, a pawl pivoted on each arm and adjustably pivotal from one position to a second position, each pawl having one driving element converging at said one position toward said belt in one direction of movement thereof around said rollers and adapted to engage said projections to move said belt in said direction upon pivoting of the associated arm in said direction, each pawl also having a second driving element converging at said second position toward said belt in the opposite direction of movement thereof around said rollers and adapted to engage said projections to move said belt in said opposite direction upon pivoting of the associated arm in said opposite direction, overcenter spring means yieldingly holding each pawl at its adjusted position, manually actuated handle means for pivoting said members, and means on said frame adapted to engage a portion of said trailer to support the latter.

5. In a device adapted for moving house trailers, a frame, roller means comprising forward and rearward rollers journaled on said frame and a continuous ground engaging belt entrained around said rollers, the latter having parallel horizontal axes and said belt having a plurality of projections spaced around its periphery and extending outward therefrom, a pair of crank members pivoted on said frame coaxially with said rollers respectively, a link having one end connected to a portion of one of said members to be shifted in the rotary direction of pivoting thereof and having its other end connected to a portion of the other member to pivot the latter in the opposite direction, each member having an arm projecting radially beyond said belt, a pawl pivoted on each arm and adjustably pivoted from one position to a second position, each pawl having one driving element converging at said one position toward said belt in one direction of movement thereof around said rollers and adapted to engage said projections to move said belt in said direction upon pivoting of the associated arm in said direction, each pawl also having a second driving element converging at said second position toward said belt in the opposite direction of movement thereof around said rollers and adapted to engage said projections to move said belt in said opposite direction upon pivoting of the associated arm in said opposite direction, overcenter spring means yieldingly holding each pawl at its adjusted position, manually actuated handle means connected to one of said crank members for pivoting the same, and means on said frame adapted to engage a portion of said trailer to support the latter.

6. In a device adapted for moving house trailers, a frame, roller means comprising forward and rearward rollers journaled on said frame and a continuous ground engaging belt entrained around said rollers, the latter having parallel horizontal axes and said belt having a plurality of projections spaced around its periphery and extending outward therefrom, a pair of crank members pivoted on said frame coaxially with said rollers respectively, a link having one end connected to a portion of one of said members to be shifted in the rotary direction of pivoting thereof and having its other end connected to a portion of the other member to pivot the latter in the opposite direction, each member having an arm projecting radially beyond said belt, a pawl pivoted on each arm and adjustably pivoted from one position to a second position, each pawl having one driving element converging at said one position toward said belt in one direction of movement thereof around said rollers and adapted to engage said projections to move said belt in said direction upon pivoting of the associated arm in said direction, each pawl also having a second driving element converging at said second position toward said belt in the opposite direction of movement thereof around said rollers and adapted to engage said projections to move said belt in said opposite direction upon pivoting of the associated arm in said opposite direction, overcenter spring means yieldingly holding each pawl at its adjusted position, manually actuated handle means connected to one of said crank members for pivoting the same, and an upright load support pivoted at its lower end on said frame intermediate said rollers and having an upwardly opening cylindrical socket at its upper end adapted to receive a depending shaft of said trailer to support the latter.

7. In a device adapted for moving house trailers, a frame, roller means comprising forward and rearward rollers journaled on said frame and a continuous ground engaging belt entrained around said rollers, said belt having a plurality of projections spaced around its periphery and extending outward therefrom, a pair of crank members pivoted on said frame, a link having one end connected to a portion of one of said members to be shifted in the rotary direction of pivoting thereof and having its other end connected to a portion of the other member to pivot the latter in the opposite direction, each member having an arm projecting radially beyond said belt, a pawl mounted on each arm and shiftable therewith, one pawl shiftable with its arm adapted in one rotary direction thereof to engage said belt projections and move the belt in one direction, the other pawl shiftable with its arm adapted in the relatively opposite rotary direction thereof to engage the belt projections and also move the belt in said one direction, manually actuated handle means for pivoting said members, and means on said frame adapted to engage a portion of said trailer to support the latter.

8. In a device adapted for moving house trailers, a frame, roller means comprising forward and rearward rollers journaled on said frame and a continuous ground engaging belt entrained around said rollers, said belt having a plurality of projections spaced around its periphery, a pair of crank members pivoted on said frame, a link having one end connected to a portion of one of said members to be shifted in the rotary direction of pivoting thereof and having its other end connected to a portion of the other member to pivot the latter in the opposite direction, a pawl mounted on each crank member and shiftable therewith, one pawl shiftable with its member adapted in one rotary direction thereof to engage the belt to move the same in one direction, the other pawl shiftable with its member adapted in the relatively opposite rotary direction thereof to engage the belt to also move the same in said one direction, manually actuated handle means for pivoting said members, and means on said frame adapted to engage a portion of said trailer to support the latter.

9. In a device adapted for moving house trailers, a frame, ground engaging roller means rotatably mounted on said frame and having a plurality of projections spaced around its periphery, a pair of crank members pivoted on said frame, a link having one end connected to a portion of one of said members to be shifted in the rotary direction of pivoting thereof and having its other end connected to a portion of the other member to pivot the latter in the opposite direction, a pawl mounted on each crank member and shiftable therewith, one pawl shiftable with its member adapted in one rotary direction thereof to engage said projections and move the roller means in one direction, the other pawl shiftable with its member adapted in the relatively opposite rotary direction thereof to engage said projections and also move the roller means in said one direction, manually actuated handle means for pivoting said members, and means on said frame adapted to engage a portion of said trailer to support the latter.

References Cited in the file of this patent

UNITED STATES PATENTS

| | | |
|---|---|---|
| 1,249,166 | Miller | Dec. 4, 1917 |
| 1,346,727 | Tucker | July 13, 1920 |
| 2,055,860 | Faries et al. | Sept. 29, 1936 |
| 2,534,575 | Conley et al. | Dec. 19, 1950 |

FOREIGN PATENTS

| | | |
|---|---|---|
| 643,218 | Germany | Apr. 1, 1937 |